United States Patent [19]

Vanheerentals et al.

[11] 4,104,069

[45] Aug. 1, 1978

[54] METHOD OF DETERMINING EXPOSURE TIMES FOR PHOTOGRAPHIC COPYING MATERIAL

[75] Inventors: Jacques Leon Vanheerentals, Schoten, Belgium; Josef Pfeifer, Unterhaching, Fed. Rep. of Germany; Helmut Klocke, Pocking, Fed. Rep. of Germany; Rudolf Paulus, Munich, Fed. Rep. of Germany

[73] Assignee: AGFA-Gevaert, AG, Leverkusen, Fed. Rep. of Germany

[21] Appl. No.: 699,862

[22] Filed: Jun. 25, 1976

Related U.S. Application Data

[63] Continuation of Ser. No. 522,945, Nov. 11, 1974, abandoned.

[30] Foreign Application Priority Data

Nov. 10, 1973 [DE]  Fed. Rep. of Germany ....... 2356277

[51] Int. Cl.$^2$ .......................... G03C 7/16; G03C 7/00; G03B 27/74
[52] U.S. Cl. ............................................ 96/23; 96/2; 355/68
[58] Field of Search .......................... 96/23, 2; 355/68

[56] References Cited

U.S. PATENT DOCUMENTS

| | | | |
|---|---|---|---|
| 3,676,122 | 7/1972 | Hellmig | 96/23 |
| 3,874,793 | 4/1975 | Nielsen | 355/68 |

OTHER PUBLICATIONS

The Theory of the Photog. Process-3rd Ed.-Mees et al., ©1966, MacMillan Co., N.Y., pp. 452 to 460.

*Primary Examiner*—Dennis E. Talbert, Jr.
*Assistant Examiner*—L. Falasco
*Attorney, Agent, or Firm*—Michael J. Striker

[57] ABSTRACT

A process of forming on a copying material from an original having respective minimum and maximum density values $D_{min}$ and $D_{max}$ a copy having respective minimum and maximum density values P and Q, different from $D_{min}$ and $D_{max}$, comprising the steps of: forming first and second non-superimposed test wedge images by exposing first and second specimens of the copying material to light of respective first and second colors, the exposure of the first and second specimens being such that the respective average exposure times are $T_B$ and $T_G$, with the exposure to light varying across each specimen according to a preselected relationship, determining from the first test wedge image the density values $D_1$ and $D_3$ which an original must have to produce upon the copying material the respective density values P and Q if the copying of such original onto the copying material is performed with light of the first color for an exposure time $T_B$, determining from the second test wedge image the density values $D_2$ and $D_4$ which an original must have to produce upon the copying material the respective density values P and Q if the copying of such original onto the copying material is performed with light of the second color for an exposure time $T_G$, determining from the values mentioned above the values $t_b$ and $t_g$ by solving at least one equation expressing the relationship between $t_b$ and $t_g$ and the values mentioned above, $t_b$ and $t_g$ being the respective exposure time intervals which must be employed for light of the first and second colors to form on the copying material from an original having the respective minimum and maximum density values $D_{min}$ and $D_{max}$ a copy having the respective minimum and maximum density values P and Q, and then forming such copy from such original.

1 Claim, 5 Drawing Figures

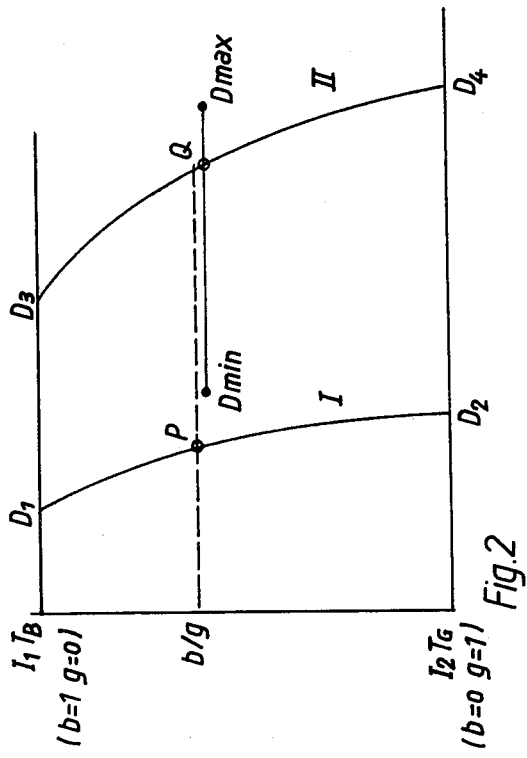
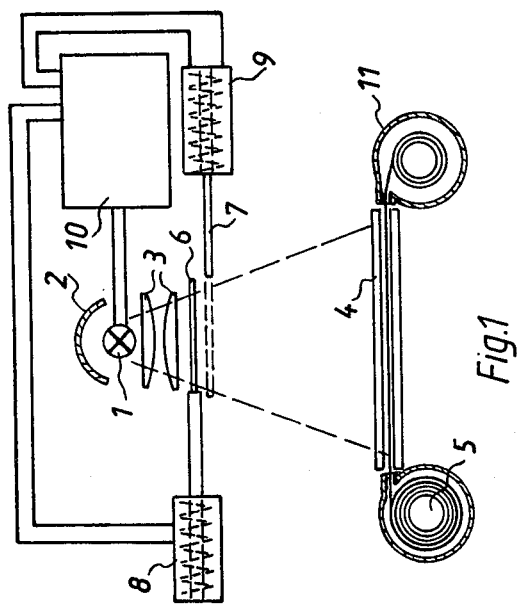
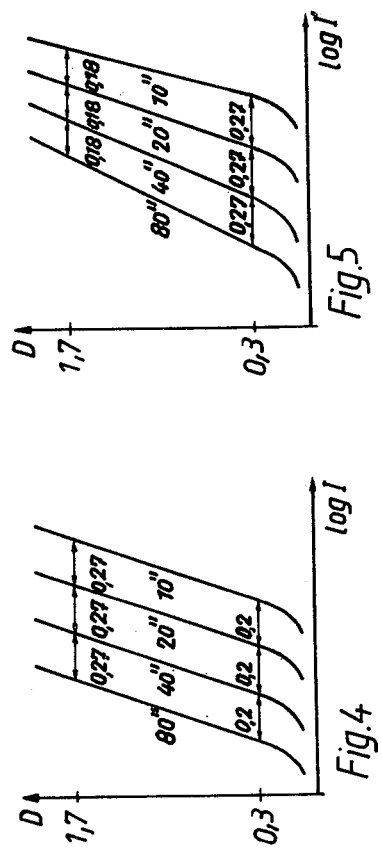
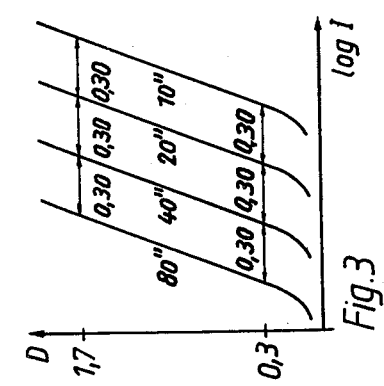
JACQUES LEON VANHEERENTALS
JOSEF PFEIFER
HELMUT KLOCKE
RUDOLF PAULUS

METHOD OF DETERMINING EXPOSURE TIMES FOR PHOTOGRAPHIC COPYING MATERIAL

This is a continuation of application Ser. No. 522,945, filed Nov. 11, 1974, now abandoned.

BACKGROUND OF THE INVENTION

The invention relates to a method of determining the exposure duration for a photographic copying material having different gradations for light of different colors, when the exposure of such copying material is performed using light of two colors. More particularly, the invention relates to forming from an original having a certain density range a copy having a desired different density range, by proper selection of the exposure times in the two colors of exposure light. Also, the invention relates to apparatuses for performing the process.

With a known process of the general type in question, gray wedge images are made for different ratios of the exposures in the two different colors, and isodensity lines are determined for the desired values of the copy density. These isodensity lines are graphically determined and constitute a basis for the subsequent determination of the relationship between the two exposures in the two different colors and the total exposure time, for copying a particular original exhibiting a range of densities which has been determined previously. This graphical method of determination requires considerable expense for the formation of the requisite gray wedge images; likewise, the evaluation of the gray wedge images for the purpose of plotting the isodensity lines requires considerable time.

SUMMARY OF THE INVENTION

It is a general object of the invention to simplify the selection of the exposure times employed for the copying of a special original.

This object, and others which will become more understandable from the description, below, of specific embodiments, can be met, according to one advantageous concept of the invention, by providing a process of forming on a copying material from an original having respective minimum and maximum density values Dmin and Dmax a copy having respective minimum and maximum density values P and Q, different from Dmin and Dmax, comprising the steps of: forming a first test wedge image by exposing a first specimen of the copying material to light of a respective first color, the exposure of the first specimen being such that the average exposure time is $T_B$, with the exposure to light varying across the first specimen according to a first preselected relationship; forming a second test wedge image by exposing a second specimen of the copying material to light of a respective second color, the exposure of the second specimen being such that the average exposure time is $T_G$, with the exposure to light varying across the second specimen according to a second preselected relationship; determining from the first test wedge image the density values $D_1$ and $D_3$ which an original must have to produce upon the copying material the respective density values P and Q if the copying of such original onto the copying material is performed with light of the first color for an exposure time $T_B$; determining from the second test wedge image the density values $D_2$ and $D_4$ which an original must have to produce upon the copying material the respective density values P and Q if the copying of such original onto the copying material is performed with light of the second color for an exposure time $T_G$: determining from the values mentioned above the values $t_b$ and $t_g$ by solving at least one equation expressing the relationship between the values enumerated above and $t_b$ and $t_g$, $t_b$ and $t_g$ being the respective exposure time intervals which must be employed for light of the first and second colors to form from an original having the respective minimum and maximum density values $D_{min}$ and $D_{max}$ a copy having the respective minimum and maximum density values P and Q; and then forming the copy from the original using the values of $t_b$ and $t_g$ determined above.

For the inventive method only two gray wedge images need be formed, namely a first gray wedge image formed by exposure to light of one color and a second gray wedge image, not superimposed upon the first, formed by exposure to light of a different second color. Conventionally, the two colors are yellow and blue. With the inventive method, it is no longer necessary to perform two successive exposures to light, using two different colors in succession, to form a single two-color test wedge image. The evaluation of the two test wedge images formed according to the invention makes it possible to use unprecedently simple means to derive all the data needed for the calculation of the requisite exposure times and the relationship between such requisite exposure times. It suffices to employ a densitometer for the purpose of determining those locations on the two test wedge images having the minimum and maximum densities desired for the copy to be formed. If the two test wedge images requisite for the inventive method are formed by employing gray wedge filters of the type provided with calibrated density scales right on the filters, then the colored wedge image formed upon the copying material will include an image of the calibrated filter-density scale. This makes it possible to determine, in a particularly direct and simple manner, the densities which an original must have to produce desired densities upon the copying material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 depicts schematically an arrangement for the formation of test wedge images upon a copying material;

FIG. 2 is a graphical depiction of the relationship between density and other variables for a particular copying material;

FIG. 3 is a plot of a family of curves, with the logarithm of light intensity being plotted along the abscissa, the density of the formed copy being plotted along the ordinate, and the duration of the exposure constituting the parameter for the family of curves; and FIGS. 4 and 5 are plots similar to that of FIG. 3, but for other copying materials.

DESCRIPTION OF THE PREFERRED EMBODIMENTS:

FIG. 1 depicts schematically an exposing device for the formation of gray wedge images which are to be evaluated for the purpose of determining exposure data. Numeral 1 designates a light source which, via a reflector 2 and a condenser 3, illuminates a gray wedge filter 4 which is in contact with a photosensitive material 5. Between the light source 1 and the gray wedge filter 4 there are positioned guide arrangements for color filters 6, 7. The color filters 6, 7 can be selectively moved into the path of the radiation emitted from source 1 by selective energization of electromagnets 8, 9 under the control of an exposure control device 10. The filters 6, 7 preferably are yellow and blue. However, they can alternatively be red and blue, for example.

In per se known manner, the gray wedge filter 4 has a density which varies uniformly, and is provided with a calibrated scale oriented in the direction of changing density, and marked with corresponding density value indications. A per se known counterpressure arrangement brings the gray wedge 4 into close contact with the photosensitive material 5, so that the image exposed onto the material 5 will be an exact copy of the gray wedge. The portions of the copying material 5 outside the range of the gray wedge are contained in light-proof containers, so that during one illumination of the gray wedge filter the photosensitive material which has already been exposed will not be affected. Additionally, there is provided a drive for a take-up drum for escape from the photographic material 5 which has already been exposed. After each illumination of the gray wedge filter 4, the photosensitive material 5 is advanced by a distance exactly equal to the length of the gray wedge filter. The take-up container for the photographic material is light-proof, so that successive wedge images made upon successive portions of the photographic material 5 need not be separated from each other by gaps.

The exposure control device 14 can, for example, be the one disclosed in West German Pat. No. 1,572,236. One exposure cycle for such a gray wedge image can occur as follows:

Initially, the yellow filter 6 is in the path of light emitted from the source towards the gray wedge filter 4, and the photographic material 5 under the gray wedge filter 4 is not exposed to light. The exposure control device 10 turns on the lamp 1 or opens a shutter which otherwise blocks the light of the lamp from reaching the photographic material 5. Upon elapse of a yellow exposure time $T_G$ sufficient to produce a medium copy density in the case of a medium original density, the light source 1 is extinguished, or alternatively the aforementioned shutter is closed. Thereafter, the electromagnet 8 is automatically energized by control device 10 and the yellow filter 6 is pulled out of the path of emitted light rays. The electromagnet 9 is deenergized automatically by control device 10, and the filter 7, under the action of a biasing spring, moves into the path of emitted light rays. Simultaneously, the gray wedge filter 4 is lifted away from the material 5, and the material 5 is advanced, under the control of device 10 or by other means, by a distance equal to the length of the gray wedge filter 4, whereupon the gray wedge filter 4 is again pressed into close contact with the material 5. Thereafter, by again turning on the light source 1 or opening the aforementioned shutter, the exposure control device 10 causes the exposure in the other color, i.e., the blue exposure, to be performed, the blue exposure time $T_B$ likewise being such as to lead to a medium copy density. The strip of photosensitive material 5 with the two successive wedge images thereon is then removed and developed.

The developed film with the two wedge images is then photoelectrically evaluated. This can be accomplished for example by means of a conventional densitometer. However, it is especially advantageous to use a densitometer having a scanning slot oriented transverse to the direction of density variation, so that incidental or accidental density variations transverse to the intended direction of uniform density variation will be compensated for. Additionally, this densitometer can include a sliding arrangement operative in the direction of the density variation and calibrated in units of gray-wedge filter density. From each pair of gray wedge images there must be derived the two locations at which the two copy-density limit values (e.g., 0.3 and 1.7) appear, since these are the extreme values of density which can be reproduced in a printing operation. When such a location having such a density value is found, the transport for the test wedge is stopped, and then, either from the calibrated scale superimposed upon the wedge image or else from the position of the transport means when the transport means is stopped in the manner just mentioned, there is made a determination of the density of the original (i.e., the gray wedge filter 4) at that location on the original which, with the use of the normal exposure time $T_B$ or $T_G$, has resulted in this copy-density value.

Accordingly, there is derived from each wedge image two density values $D_1$, $D_3$ or $D_2$, $D_4$, indicated graphically in FIG. 2. In the graph of FIG. 2, density increases towards the right. The upper horizontal line represents the scale of the copy-density values in the case of a pure blue exposure; the lower horizontal line represents the density values which result with the exposure duration $T_G$ in the case of a pure yellow exposure. Intermediate horizontal lines would correspond to desired mixtures of the two copying-light colors, with the respective fractions b and g of the copying exposure duration in the two colors always adding to 1. The curves extending between $D_1$ and $D_2$ are extending between $D_3$ and $D_4$ are so-called equi-density curves; i.e., there are given for the different exposure relationships the original-density values which in the respective exposures result in a copy density of, for example, 0.3. The curve between the two end points $D_3 D_4$ represents the density values of the original which for the respective exposures lead to the maximum desired copy density value of 1.7.

In the past, these isodensity curves were plotted by making a large number of test exposures, plotting the graph points corresponding to the measured values, and then interpolating to form continuous curves. This was a relatively tedious process.

The present method proceeds from the fact that by means of calculated superimpositions of the component exposures the intermediate values between the pure yellow and the pure blue exposures can be determined. This calculation is performed on the basis of the known density equation, according to which the absorbed opaquing light energy E is determined by $$E_1 = \frac{I_1 \cdot t_1^{p_1}}{\text{antilog } D_1} \tag{1}$$

In this equation, I is the intensity of the copying light at one point on the copying material, t is the exposure time, and p is the Schwarzschild exponent for the copying material and copying time employed. According to the conventional Reciprocity Law, the same degree of exposure is achieved regardless of the intensity of the exposure light and the duration of the exposure time, so long as the product of those two quantities is the same. This is ordinarily expressed by the Reciprocity Law equation $I \cdot t = $ const.

However, as is very well known, virtually all photographic materials exhibit so-called Reciprocity Law failure or breakdown, so that in actual practice the just-mentioned equation has proved to be $I \cdot t^p = $ const. The exponent $p$ is known as the Schwarzshild exponent. This latter equation can, by taking the logarithms of both sides, be converted into the equation $\log (I) + p \log (t) = \log $ (const.). Equating $\log$ (const.) $= k$ for simplicity, the definition of the Schwarzschild exponent becomes $p = [U - \log (i)]/\log (t)$. For the case of a mixed exposure with two successively performed differently colored exposures, the opaquing light energy for the exposure of the point P in the graph of FIG. 2 can be computed from equation (2), below:

$$E = \frac{I_1 (t_1 b)^{p_1} + I_2 (t_2 g)^{p_2}}{\text{antilog } P} = \frac{I_1 t_1^{p_1} b^{p_1} + I_2 t_2^{p_2} g^{p_2}}{\text{antilog } P} \quad (2)$$

Setting the light energy at the points $D_1$, $D_2$ and P equal to one another, the original density value which leads to a copy density value of P can be determined from the following equation:

$$P = \log (b^{p_1} \cdot 10^{D_1} + g^{p_2} \cdot 10^{D_2}) \quad (3)$$

For the point Q a similar equation can be set up. By inserting specific values into equation (3), equation (3) can be converted into a formula for the components of the individual color exposures relative to the total exposure, given the four density limit values $D_1$, $D_2$, $D_3$, $D_4$, as well as the density range $\Delta D$ of the original. The equation is given below:

$$10^{\Delta D} = \frac{b^{p_1} \cdot 10^{D_3} + g^{p_2} \cdot 10^{D_4}}{b^{p_1} \cdot 10^{D_1} + g^{p_2} \cdot 10^{D_2}} \quad (4)$$

After determining the four density values $D_1$, $D_2$, $D_3$, $D_4$ which lead to the predetermined limit values for the copy density, and after determining the Schwarzschild exponents $p_1$ and $p_2$ for the emulsion employed, equation (4) contains only the two unknowns $b$ and $g$, which add to 1 (unity). However, the resulting equation cannot be solved directly. A value for the color ratio can be derived from equation (4) only by means of an iterative process — i.e., by first inserting into the equation component values for the color exposures made by guessing on the basis of past experience, then calculating and then determining whether the two sides of equation (4) differ by an acceptable amount. Based upon the magnitude and sign of the inequality of the two sides of equation (4), the process can be repeated using better approximations for the color components $b$ and $g$. To perform this calculation, use is advantageously made of an electronic desk calculator or a comparable special-purpose calculator circuit specially designed for the solution of the equation in question by an iterative numerical technique. This calculator requires a relatively large storage capacity for storing the logarithmic values which must be available for the solution of this exponential equation.

From the values of the color exposure fractions calculated in this manner, from the base exposure $T_B$ or $T_G$ for the making of the gray-wedge images, and from the minimum or maximum density $D_{min}$ or $D_{max}$ of the particular original to be copied, one can calculate the exposure in the individual colors according to the following formula, in which $t_b$ and $t_g$ are the two exposure times in the respective colors.

$$t_b = T_B \cdot b \cdot \text{antilog}(D_{min} - P) \quad (5)$$

$$t_g = T_G \cdot g \cdot \text{antilog}(D_{min} - P) \quad (6)$$

In the case of a film much used for this blue-yellow exposure process, the Schwarzschild exponent P is not constant for all exposure times. This will be clear from FIGS. 3-5.

In the graph of FIG. 3, the logarithm of the copying-light intensity I is plotted along the abscissa. The resulting copy density value D is plotted along the ordinate, so that for gray-wedge exposures so-called opaquing curves result. Each curve illustrated corresponds to an exposure time one-half that associated with one of its two neighbors and twice that associated with the other of its two neighbors. The spacing of the individual curves, which in their linear portions are parallel to each other, corresponds to the logarithm of 2, i.e., approximately 0.3. A Schwarzschild exponent $p = 1$ is assumed for all exposure intensities and exposure times.

The graph of FIG. 4 is similar to that of FIG. 3, with the opaquing curves for the individual exposures again differing from each other by factors of 2. However, now a Schwarzschild exponent of $p = 0.9$ is assumed, which for a certain type of film is substantially the true value for all ranges of exposure time. The spacing between the individual darkening curves accordingly corresponds to $0.30 \cdot 0.9 = 0.27$. In FIG. 4, as in FIG. 3, the linear portions of the set of opaquing curves are parallel to each other.

In the set of opaquing curves depicted in FIG. 5, it is assumed that the Schwarzschild exponent $p$ varies linearly with density and has values of 0.9 and 0.6 for respective copy densities of 0.3 and 0.6. As a result, the linear portions of the opaquing curves are no longer parallel to each other; instead, the linear portions of the opaquing curves tend to converge with increasing density. These graphs were experimentally derived for a very frequently used two-layer photographic material, so that the density variations for the material can be mathematically expressed with sufficient exactness by so choosing the Schwarzschild exponent $p$. In this case, equation (4), used to determine the individual exposure components, the factors $b$ and $g$, is modified as follows:

$$10^{\Delta D} = \frac{b^{p_{1.7}} \cdot 10^{D_3} + (1 - b)^{p_{1.7}} \cdot 10^{D_4}}{b^{p_{0.3}} \cdot 10^{D_1} + (1 - b)^{p_{0.3}} \cdot 10^{D_2}} \quad (7)$$

In this case, it is assumed that the Schwarzschild exponents p for the two color exposures are equal, and that they vary similarly to each other with variations in copy density. Accordingly, in equation (7) above, the designations of the Schwarzschild exponents $p$ include the respective copy densities as subscripts.

From equation (7), as explained above, it is possible to compute the component of the color exposures relative to the total exposure and accordingly the exposure times for the individual colors. In actually performing the copying of an original having the extreme density values $D_{min}$ and $D_{max}$, use can be made of an exposure control device like the device 10 in FIG. 1. In principle, however, it is sufficient to employ a simple electric timer which is preset for the calculated times and in correspondence thereto performs the change of filters.

In principle, the calculation can be performed without a calculator, for example with a suitably designed slide rule.

It will be understood that each of the elements described above, or two or more together, may also find a useful application in other types of constructions differing from the types described above.

While the invention has been illustrated and described as embodied in a two-step yellow-blue copying process, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process of forming from an original having respective minimum and maximum density values $D_{min}$ and $D_{max}$ on a copying material an image of the original having respective minimum and maximum density values P and Q, different from $D_{min}$ and $D_{max}$, comprising the steps of forming a first test wedge image by exposing a first specimen of said copying material to light of a respective first color, the exposure of said first specimen being such that the average exposure time is $T_B$, with the exposure to light increasing across said first specimen; forming a second test wedge image by exposing a second specimen of said copying material to light of a respective second color, the exposure of said second specimen being such that the average exposure time is $T_G$, with the exposure to light increasing across said second specimen; determining from said first test wedge image the density values $D_1$ and $D_3$ which an original must have to produce upon said copying material the respective density values P and Q if the copying of such original onto said copying material were performed with said light of said first color for an exposure time $T_B$; determining from said second test wedge image the density values $D_2$ and $D_4$ which an original must have to produce upon said copying material the respective density values P and Q if the copying of such original onto said copying material were performed with said light of said second color for an exposure time $T_G$; determining from the values enumerated above the values $b$, $g$, $t_b$ and $t_g$, $t_b$ and $t_g$ being the respective exposure time intervals which must be employed for said light of said first and second colors to form from an original having said respective minimum and maximum density values $D_{min}$ and $D_{max}$ on said copying material an image of the original having said respective minimum and maximum density values P and Q and where $b = t_b/(t_b + t_g)$ and where $g = t_g/(t_b + t_g)$, by solving the equation $$10^{(D_{max} - D_{min})} = \frac{b^{p_1} \cdot 10^{D_3} + g^{p_2} \cdot 10^{D_4}}{b^{p_1} \cdot 10^{D_1} + g^{p_2} \cdot 10^{D_2}}$$

for the unknowns $b$ and $g$ using a reiterative numerical method, where $p_1$ and $p_2$ are the Schwarzschild exponents for said copying material for the two color exposures employed, by solving for $t_b$ using the equation $$t_b = T_B \cdot b \cdot \text{antilog}(D_{min} - P),$$

and by solving for $t_g$ using the equation $$t_g = T_G \cdot g \cdot \text{antilog}(D_{min} - P),$$

forming from said original said image of said original by illuminating said original with said light of said first color and exposing said copying material to such light for a time interval $t_b$ and by illuminating said original with said light of said second color and exposing said copying material to such light for a time interval $t_g$.

* * * * *